United States Patent [19]

Heimberger et al.

[11] 4,046,862
[45] Sept. 6, 1977

[54] PROCESS FOR THE PRODUCTION OF CYANOGEN CHLORIDE USING HYDROGEN PEROXIDE WITH PRESSURE

[75] Inventors: Werner Heimberger; Gerd Schreyer, both of Hanau, Germany

[73] Assignee: Deutsche Gold- und Silber-Scheideanstalt vormals Roessler, Frankfurt, Germany

[21] Appl. No.: 684,352

[22] Filed: May 7, 1976

[30] Foreign Application Priority Data

May 15, 1975 Germany ............... 2521581
May 15, 1975 Germany ............... 2521582
May 12, 1975 Germany ............... 2521012
May 12, 1975 Germany ............... 2521013

[51] Int. Cl.² ............................................. C01B 21/18
[52] U.S. Cl. .................................. 423/383; 423/371
[58] Field of Search ................. 423/371, 379, 383

[56] References Cited

U.S. PATENT DOCUMENTS 3,840,648   10/1974   Heilos et al. ................. 423/383

FOREIGN PATENT DOCUMENTS 347,989   5/1931   United Kingdom ............... 423/383

Primary Examiner—Earl C. Thomas
Attorney, Agent, or Firm—Cushman, Darby & Cushman

[57] ABSTRACT

Cyanogen chloride or cyanogen bromide is prepared by reaction of hydrogen cyanide with hydrogen chloride or hydrochloric acid (or hydrogen bromide or hydrobromic acid) and hydrogen peroxide in aqueous medium in the presence of cupric and ferric ions under superatmospheric pressure, preferably between 1.5 and 16 bar, and the cyanogen chloride (or cyanogen bromide) recovered separated from oxygen and nitrogen. In a preferred form of the invention, the hydrogen chloride or hydrochloric acid is either partially or entirely formed directly in the recycling catalyst solution of cupric and ferric ions by reaction of chlorine and hydrogen cyanide, either with or without pressure.

25 Claims, 4 Drawing Figures

PROCESS FOR THE PRODUCTION OF CYANOGEN CHLORIDE USING HYDROGEN PEROXIDE WITH PRESSURE

It is known to react hydrogen cyanide and hydrogen chloride with hydrogen peroxide in the presence of an aqueous solution of cupric ions and ferric ions as catalysts to form cyanogen chloride, see Heilos German Pat. No. 2,027,957 and Heilos German Pat. No. 2,131,383 and Heilos U.S. Pat. No. 3,840,648, which is related to the two German patents. The entire disclosure of the Heilos United States patent is hereby incorporated by reference and relied upon.

The reaction takes place in a yield of about 90–92% based on the hydrogen cyanide, thereby the always-trifling decomposition of the hydrogen peroxide and the oxidation of the hydrogen cyanide causes a part up to 5 weight % each of oxygen and carbon dioxide in the cyanogen chloride gas.

In the trimerization of cyanogen chloride to cyanuric chloride there appears an increased consumption of the activated carbon through the oxygen content, whereby the continuous production of cyanuric chloride is made difficult through the frequent interruption of the operation to add activated carbon.

The object of the invention is to develop a continuous process for the production of cyanogen chloride from hydrogen cyanide and hydrogen chloride in which there results a cyanogen chloride which is free of oxygen.

It has now been found that cyanogen chloride can be completely continuously produced practically free of oxygen and nitrogen if the reaction of hydrogen cyanide and hydrogen chloride or hydrochloric acid is carried out in aqueous medium in the presence of cupric and ferric ions under superatmospheric pressure and, thereupon, cyanogen chloride recovered separated from oxygen and nitrogen.

As pressures, there are employed superatmospheric pressures of 1.5 to 16 preferably 2 to 4 bar. It was surprising that the use of pressure not only did not check the reaction but even increased the facility of the formation of cyanogen chloride although, according to the overall equation

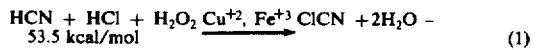

$$\text{HCN} + \text{HCl} + \text{H}_2\text{O}_2 \xrightarrow{\text{Cu}^{+2}, \text{Fe}^{+3}} \text{ClCN} + 2\text{H}_2\text{O} - 53.5 \text{ kcal/mol} \quad (1)$$

the opposite would be expected since cyanogen chloride escapes from the reaction solution at 1 bar, and so, could influence the equilibrium.

In using pressure, it has been proven on the contrary that cyanogen chloride dissolves completely in the reaction solution and the reaction of the hydrogen cyanide, and, therefore, the yield, is substantially increased.

Furthermore, the cyanogen chloride can now be directly separated from oxygen, nitrogen and the greatest part of the carbon dioxide.

Because of the differences in solubility under pressure between cyanogen chloride and the oxygen formed by the slight decomposition of the hydrogen peroxide in the reaction solution, it was now possible to draw-off from the head of the reactor the gases oxygen, nitrogen and carbon dioxide which are not soluble in the reaction solution. They were freed from a cyanogen chloride portion by a pressure wash and discharged via a pressure check valve.

In this manner, a cyanogen chloride gas was obtained by release of the reaction solution which was nearly free from oxygen and could be used without any further purification, after previous drying, for trimerization to cyanuric chloride.

As previously stated, according to the invention, the cyanogen chloride can be completely continuously produced. In this regard, see Heilos German Pat. Nos. 2,027,957 and 2,131,383 and Heilos U.S. Pat. No. 3,840,648, i.e., the added catalyst solution is separated-off in the course of the process and is returned to the reaction step.

As catalysts, there can be used, for example, those mentioned in the Heilos patents mentioned supra, e.g., cupric chloride, cupric cyanide, cupric bromide, cupric sulfate, ferric chloride, ferric bromide, and ferric sulfate.

The process can also be used to make cyanogen bromide by replacing the hydrogen chloride (or hydrochloric acid) by hydrogen bromide (or hydrobromic acid).

Since hydrogen chloride, in water, forms hydrochloric acid (and hydrogen bromide forms hydrobromic acid), the claims will simply recite hydrochloric acid or hydrobromic acid.

Also, in the case of the completely continuous production of cyanogen chloride, the water brought into the cycle with the hydrogen peroxide and the hydrochloric acid, together with the water formed in the reaction, must be removed. This can be accomplished in the types of process described in Heilos German Pat. No. 2,131,383 and Heilos U.S. Pat. No. 3,840,648. Moreover the cupric or ferric ions from the waste water can be separated by precipitation with alkaline or alkaline earht hydroxides, i.e., sodium hydroxide and potassium hydroxide.

However, it has now been found to be extraordinarily favorable to remove this water brought in with the components, and the water formed in the reaction by using an iron exchanger, i.e. a cation exchanger. Thereby, the copper and iron ions are bound on the ion exchanger. By this type of removal, the copper and iron ions are recovered, but the ammonium chloride formed in the catalyst solution by the oxidation of the hydrogen cyanide is only enriched up to a fixed level in the circulating solution, since it is not bound by the ion exchanger and, thus, is taken away with the waste water.

A somewhat modified process has proven advantageous if there is added, as a reaction component, a liquid hydrogen cyanide which is stabilized with phosphoric acd. In this case, the ion exchanger is not immediately treated with mineral acids, e.g., hydrochloric acid after charging the catalyst solution to be concentrated, but the mineral acid treatment is first applied after previous intermediate wash with alkaline-acting materials such as dilute liquors, e.g., sodium hydroxide or potassium hydroxide, or alkaline-reacting salt solutions.

As ion exchangers, there can be employed the commercial cation exchangers. Thus, there are suited ion exchange resins based on polystyrene or styrene-divinyl benzene copolymer to which acid groups are attached. Thus, there can be employed sulfonated or phosphonated styrene-divinyl benzene copolymers. The preferred cation exchangers are macroporous exchangers based on polystyrene having weak, acid exchange-active groups attached thereto. These groups form complexes with heavy metal ions.

After saturation with the catalyst solution, the ion exchanger is washed, and the copper and iron ions dissolved-off with dilute mineral acid. Very suitable for this purpose is 1 to 10 weight % of aqueous hydrochloric acid, and the catalyst solution, then in concentrated form, is returned to the cycle.

The higher the concentration of the catalyst solution supplied, the more is the amount of water that can be removed per unit of time. It is also possible, to remove water in the following way, preferably, whey initially an aqueous solution of hydrochloric acid is used with a low strength, i.e., from 12 - 6% by weight: The precipitation of copper and iron ions with alkaline or alkaline earth hydroxides takes place at a pH-value from 10 - 11 and at temperature of about 100° C.

Ferric phosphate present can be precipitated as hydroxide and ammonia can be removed by distillation. After separation from the waste water the hydroxides are dissolved in hydrochloric acid and returned to the cycle.

Very preferred is a continuous removal and continuous return of regenerated catalyst solution in order to maintain constant the optimum catalyst concentration.

In carrying out the process, it is desirable to maintain the pH during the reaction between 0.1 and 0.5, preferably between 0.25 and 0.35, as well as to regulate the reaction temperature between 40°-60° C., preferably about 50° C.

The heat of reaction is partially used to maintain the reaction temperature; however, the excess must be drawn-off by cooling.

By the above-named procedures, the formation of cyanogen is substantially avoided. Also, the decomposition of hydrogen peroxide is held within narrow limits.

Hydrogen cyanide is added in customary form, preferably, in gaseous or liquid form. Hydrogen chloride, likewise, is used in gaseous form, or else as aqueous solution containing 0.5 to 36 weight % hydrogen chloride, preferably containing 8-20 weight % of hydrogen chloride. Likewise, hydrogen peroxide is employed in commercial solutions, e.g., also 25 to 90 weight %, preferably as 30-50 weight % hydrogen peroxide.

The reactants should be used in about stoichiometric amounts; for example, hydrogen cyanide, hydrogen chloride and hydrogen peroxide each is present in the individual range of 0.9 to 1.1 mole.

The yield of cyanogen chloride based on the hydrogen peroxide is most favorable at an optimum catalyst concentration which is 0.077 mol/l for copper ions and 0.0125 to 0.025 mol/l of iron ions. Higher or lower concentrations are possible but do not influence the yield of cyanogen chloride in so favorable a manner. Generally, 0.5 to 0.005 mole per liter of circulating solution are usable, both for copper and for iron ions.

The reaction is carried out in customary reaction tubes for the production of cyanogen chloride, which tubes, however, are provided with a discharge valve in the upper portion.

The technical advance of the process of the invention is first in that the hydrogen cyanide is more completely reacted to cyanogen chloride in contrast to the pressureless process whereby the hydrogen cyanide portion of the gas is noticeably reduced and the yield of cyanogen chloride is substantially increased. Besides, there is formed a cyanogen chloride which is practically free of oxygen, so that the trimerization to cyanuric chloride can be carried out in considerably simpler manner than was previously possible.

In a preferred form of the invention, the hydrogen chloride or hydrochloric acid is either partially or entirely formed directly in the recycling-catalyst solution of cupric and ferric ions by reaction of chlorine and hydrogen cyanide, either with or without pressure.

Preferably, the formation of hydrogen chloride or hydrochloric acid is undertaken at such a place in the cycle at which the circulating medium is practically free from hydrogen peroxide.

The course of the reaction procedures is according to the following formulae:

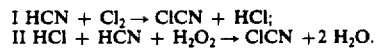

$$\text{I } HCN + Cl_2 \rightarrow ClCN + HCl;$$
$$\text{II } HCl + HCN + H_2O_2 \rightarrow ClCN + 2 H_2O.$$

The advantage which the combination of equations I and II for carrying out the process brings along with it is that the chlorine is completely converted into cyanogen chloride without the accumulation of hydrochloric acid which must be separated-off. Hereby there is thus eliminated also the preparation of a storage space for the accumulating hydrochloric acid.

Both reactions I and II can take place in a single reactor (see FIG. 2), or each reaction can be carried out in a separate reactor (see FIG. 3). Thereby, as already stated, superatmospheric pressure is used for the chlorination of the hydrogen cyanide, or there can be used normal pressure. As superatmospheric pressure for the chlorination of the hydrogen cyanide, there can be used 1.5 to 16 bar, preferably 2 to 4 bar.

In addition to the surprising results set forth above in connection with the basic process, it could not be foreseen that the chlorination reaction, according to equation I, could be carried out in the catalyst solution under pressure without side reactions.

The technical advance of this preferred form of the process of the invention is that the hydrogen cyanide is completely reacted to cyanogen chloride in contrast to the pressureless process whereby the hydrogen cyanide portion of the gas is noticeably reduced and the yield of cyanogen chloride is substantially increase. Besides, there is formed a cyanogen chloride which is practically free of oxygen, so that the trimerization to cyanuric chloride can be carried out in considerably simpler manner than previously.

Additionally, in contrast to the previously-customary reaction processes, there is a still further advantage through direct chlorination of hydrogen cyanide, namely, that hydrochloric acid resulting inthe chlorination can be immediately converted into cyanogen chloride and there is eliminated a separation of the hydrochloric acid.

In this preferred form of the invention, there is also preferably employed the removal of the water together with the catalyst solution from the circulating solution with the help of cation exchangers, as is described above.

The invention will be understood best in connection with the drawings wherein.

Unless otherwise indicated, all parts and percentages are by weight.

The process of the invention will be explained further in the following examples:

EXAMPLE 1

Figure 1:
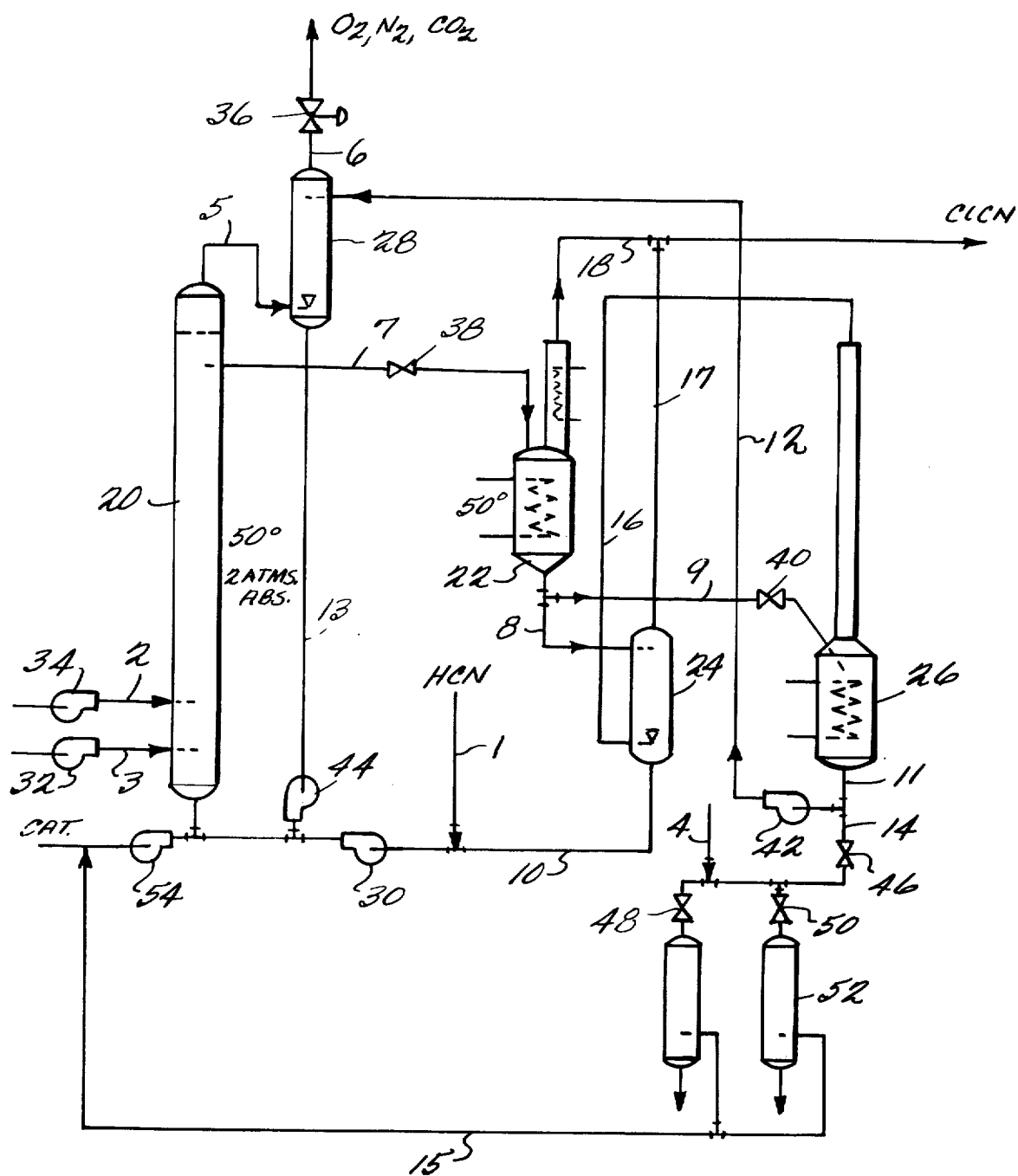
FIG. 1 is a schematic illustration of one form of apparatus for carrying out the process of the invention

In the continuously-operating apparatus shown in FIG. 1, there were recirculated 40 liters of an aqueous solution containing 13.0 grams $CuCl_2.2H_2O/l$ and 3.35 grams $FeCl_3.6H_2O/l$ through a reactor 20, let-down vessel 22, washer 24, volatile stripper 26 and pressure washer 28.

1.6 kg/h of gaseous hydrogen cyanide were added via line 1 into the reaction solution found in line 10, which solution was conveyed through pump 30 into the reactor 20. There were closed into reactor 20, via line 3, 4.301 kg/h of 50 weight % aqueous hydrogen peroxide (which is 10% excess over the stoichiometric amount) and over line 2, 21.6 kg/h of 10 weight % aqueous hydrochloric acid with the help of pumps 32 and 34.

In continuous operation, by regulation of the addition of hydrochloric acid, the pH was held exactly between 0.25 and 0.35. Through the cyanogen chloride released, there was built up in reactor 20 and pressure washer 28 a pressure up to 4 bar which was held constant via the pressure check valve 36 at the top of the pressure washer. There were collected at the top of the reactor 20 the oxygen released by the decomposition of the hydrogen peroxide and the carbon dioxide and nitrogen formed by oxidation and subsequent reactions.

The reaction temperature was held at about 50° C. The cyanogen chloride dissolved in the catalyst solution under the builtup pressure goes via line 7 and expansion valve 38 into the letdown container 22. Here, the concentration of the solution goes down from about 5 weight % cyanogen chloride to about 1-2 weight % cyanogen chloride so that, in a circulation of about 100 liters/h, about 3.5 kg of cyanogen chloride could be released.

A portion of catalyst solution collected in the sump of let-down container 22 goes via line 9 and valve 40 into the volatiles stripper 26 where, at 100° C., it is stripped of cyanogen chloride, hydrocyanic acid and carbon dioxide. There were stripped 40 liters of catalyst solution per hour. Of this, 16 liters/h went via lines 11 and 12 through pump 42 to pressure washer 28 where the gas mixture collected at the head of reactor 20 flows via line 5, is washed free of the cyanogen chloride portion, expanded via line 6, and pressure check valve 36, and is discharged.

The washing solution arrives back into reactor 20 via line 13 and pump 44.

The gas escaping from volatiles stripping column 26, besides cyanogen chloride and carbon dioxide, still contains a portion of the hydrogen cyanide not reacted in reactor 20, which hydrogen cyanide is washed out of the gas mixture in washer 24 with expanded catalyst solution led to the washer via line 8. The volatiles from stripping column 26 go via line 16 to washer 24.

The washed gas goes from washer 24 via line 17 and is united with the gas flowing from line 18 and, after going through a drying tower (not shown), is subjected to the trimerization. The washing solution from washer 24 goes via line 1o, in which the charging of hydrogen cyanide also takes place, via pump 30, together with the solution from the pressure washer 28, which is converged through the pump 44 back into the reactor 20.

The removal of 25 liters per hour of waste water takes place via stripped catalyst solution via line 14 and valve 46, selectively via valve 48 or valve 50, to the cation exchange unit 52.

The cupric and ferric ions are held back in the ion exchanger while the ammonium chloride containing waste water is led to the sewer. The solution of the cupric and ferric ions takes place with 10 weight % hydrochloric acid, alternately added via line 4 to the two ion exchangers saturated with metal ions. The precipitation of copper and iron ions with alkaline or alkaline earth hydroxides also takes place at a pH-value frm 10.5 – 11 and at a temperature of about 100° C in a vessel 55.

Figure 1A:
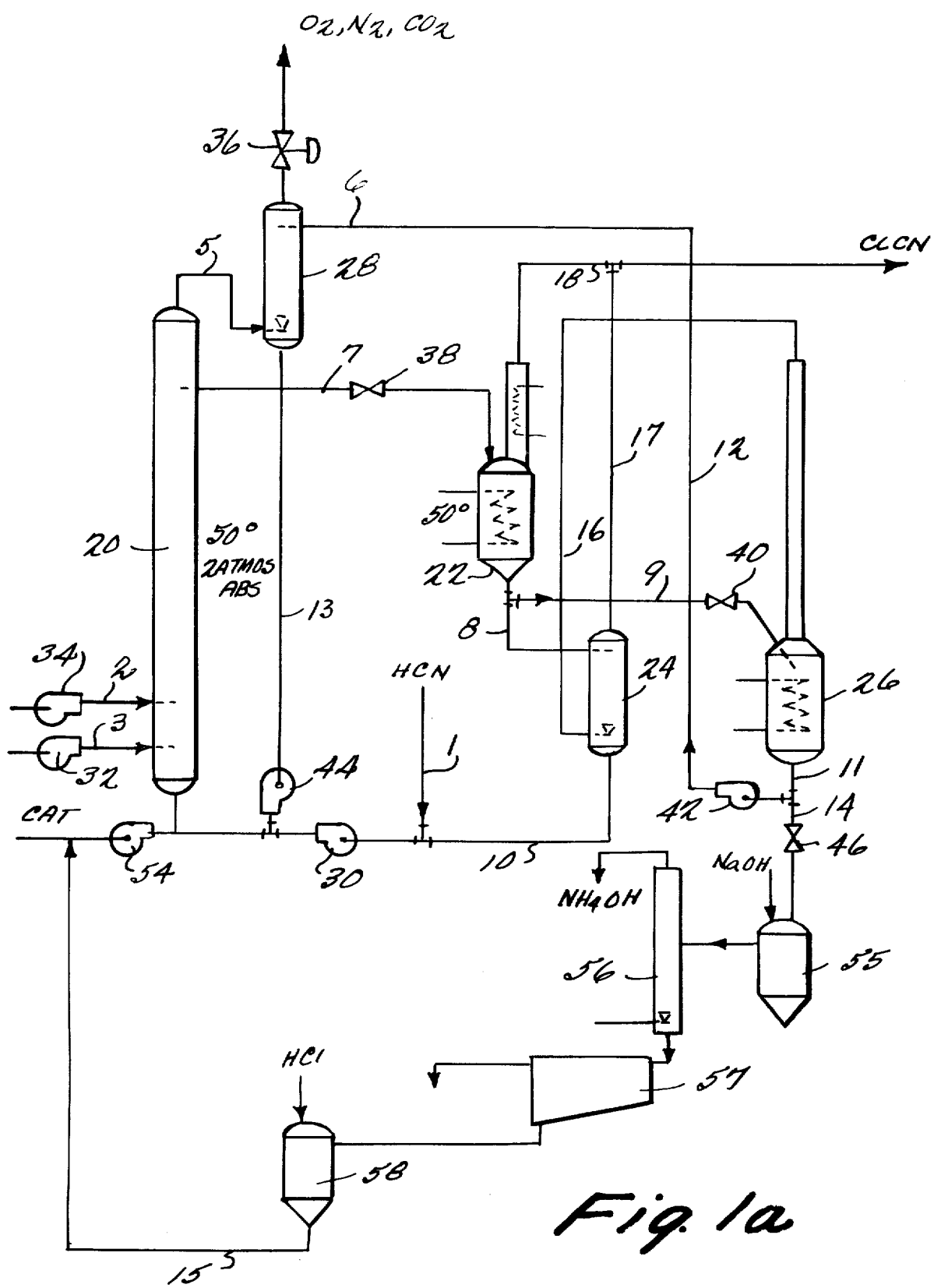
FIG. 1a is a schematic illustration of a modification of FIG. 1 showing the removal of iron ions by precipitation as the hydroxide.

Ferric phosphate present is precipitated as hydroxide. Ammonia is removed by distillation at 56. After separation in clarifier 57 from waste water the hydroxides are dissolved in vessel 58 with hydrochloric acid and returned via line 15 and pump 54 to reactor 20. See FIG. 1a.

The fresh catalyst solution formed is returned via line 15 and pump 54 to maintain the ion concentration in reactor 20.

The average yield of cyanogen chloride based on hydrogen cyanide is 96.2% of theory. The cyanogen chloride contains 0.1 to 0.3% weight % of cyanogen 0.5 weight % hydrogen cyanide, and less than 0.5 eight % $CO_2 + N_2$. An oxygen content is not detectable by gas chromatography.

EXAMPLE 2

In the same apparatus as in Example 1, as described in Example 1, there were circulated 40 liters of a solution of 13.0 grams of $CuCl_2.2H_2O/l$ and 6.7 grams $FeCl_3.6H_2O/l$.

There were supplied to reactor 20 1.6 kg/h of liquid hydrogen cyanide stabilized with 0.1 weight % $H_3PO_4$ via line 1, line 10 and pump 30. The hydrogen cyanide, together with the reaction solution, is conveyed back to line 10.

There were metered into the reactor 20 via line 3, 4.3 kg/h of 50 weight % aqueous hydrogen peroxide (which was 10% excess over the stoichiometrical amount) and via line 2, 27.0 kg/h of 8 weight % aqueous hydrochloric acid with the help of the pumps 32 and 34. The pH value was controlled by a pH electrode and held at a pH of 0.25 to 0.35 by suitable addition of hydrochloric acid.

The reaction result was the same as in Example 1. However, the discharged waste water was increased corresponding to the greater dilution of the hydrochloric acid to about 30 liters per hour.

The removal took place as in Example 1, with the following supplement. The phosphoric acid adhering in the ion exchanger was washed out with 0.5 weight % aqueous sodium hydroxide before the copper and iron ions were eluted and returned as in Example 1.

The average yield of cyanogen chloride based on hydrogen cyanide is 96% of theory. The purity of the product is the same as in Example 1.

EXAMPLE 3

Figure 2:
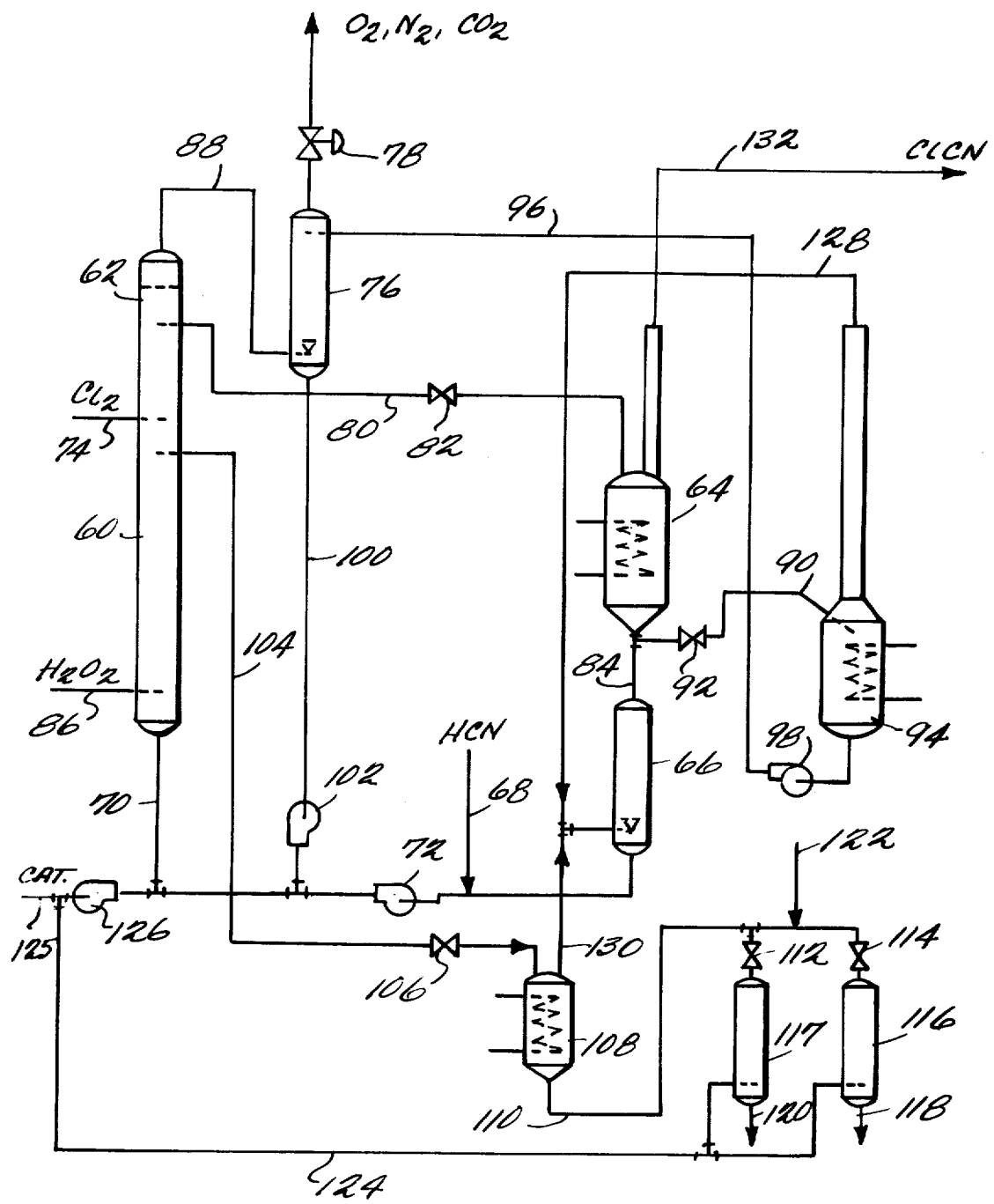
FIG. 2 is a schematic illustration of an apparatus for carrying out the preferred process in which reaction I and II are carried out in a single reactor.

In the technical apparatus represented by FIG. 2, there were circulated per hour 45 liters of an aqueous solution containing 13.0 grams of $CuCl_2.2H_2Ol$, and 6.7 grams of FeCl$_3$.6H$_2$O/1 via reactor 60, its upper portion 62, let-down vessel 64 and washer 66.

There were metered-in per hour, via line 68, 1.6 kg of liquid hydrogen cyanide which was stabilized with 0.1 weight % of ortho phosphoric acid and this solution was supplied to reactor 60 via line 70 and pump 72. There were added 2.0 kg/h of chlorine gas via ine 74 and therethrough, half the amount of hydrogen cyanide reacted to form cyanogen chloride and hydrogen chloride.

Through the cyanogen chloride formed, a pressure of about 3 bar was built-up in the reactor 60 with the upper portion 62 and the pressure washer 76 confined by the pressure valve 78. Under this pressure, the cyanogen chloride wvent into solution up to a 5 weight % solution. The cyanogen chloride-containing catalyst solution was led into let-down container 64 via line 80 and released via valve 82.

The solution, with about 1-2 weight % cyanogen chloride, then arrived back at reactor 60 via line 84, the washer 66, line 70 and pump 72. The hydrochloric acid formed by the chlorination in reactor portion 62 was likewise reacted with the other half of the hydrogen cyanide to cyanogen chloride in reactor 60 by the addition of 2.22 kg/h of aqueous hydrogen peroxide (50 weight %), (which was introduced via line 86 in a 10% excess over the equivalent amount needed for equation II).

In continuous operation, there was thus constantly consumed the entire amount of hydrogen cyanide and the hydrochloric acid formed in the chlorination by the reaction to cyanogen chloride in the catalyst-containing circulating solution and, thereby, the pH permanently held from 0.25 to 0.35 in the circulating solution.

The gaseous mixture (O$_2$, N$_2$, CO$_2$) arising through the trivial decomposition of the hydrogen peroxide and the oxidation of the hydrogen cyanide was collected in upper portion 62 of reactor 60 and arrived via line 88 into pressure washer 76, where it was washed free of the cyanogen chloride portion and discharged over pressure check valve 78. The solution necessary for the pressure washer was withdrawn from let-down container 64 via line 90 and valve 92, stripped in the volatile stripping column 94, and led via line 96 and pump 98 into pressure washer 76. From there, it returned to reactor 60 via line 100 and pump 102.

The water brought into the recirculating solution with the hydrogen peroxide, together with the water formed in the reaction, was drawn-off below the chlorine gas inlet line (line 74) and led via line 104 and relief valve 106 into the stripper 108.

The catalyst solution withdrawn at the indicated place at this point had only about 0.4 weight % hydrogen chloride and no hydrogen peroxide.

After the stripping in stripper 108, this catalyst solution arrives via line 110 and valve 112 or valve 114 at the ion exchanger 116 (or ion exchanger 117), filled with the same cation exchanger resin as in Example 1 where it was freed from cupric and ferric ions and led to the sewer via line 118 (or line 120). The at-times-loaded ion exchange column was regenerated by the addition of 10 weight % of hydrochloric acid via line 122, while the column was washed with 0.5 weight % aqueous sodium hydroxide in order to separate-off the phosphoric acid before the recovery of the copper and iron ions.

The thus-fresh recovered catalyst solution was returned to the cycle via line 124 and pump 126, as well as line 70. The gas leaving container 94 via line 128 and leaving container 108 via line 130 contains, besides cyanogen chloride chiefly, the hydrogen cyanide not reacted in reactor 60, which hydrogen cyanide is washed out in washer 66, and returns via line 70 and pump 72 into reactor 60. The cyanogen chloride is removed from let-down vessel 64, via line 132. Catalyst solution was initially introduced via line 125.

EXAMPLE 4

Figure 3:
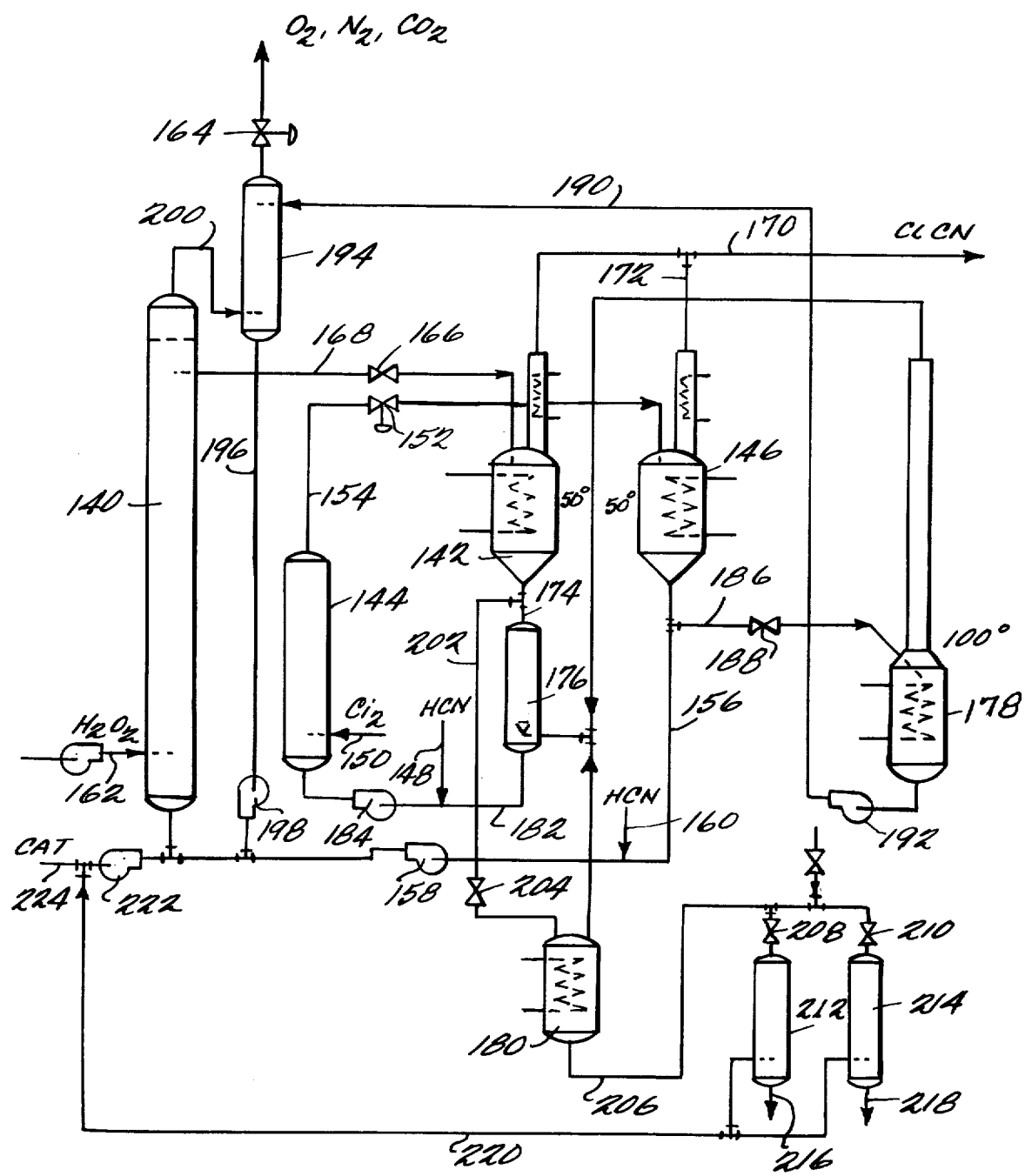
FIG. 3 is a schematic illustration of an apparatus for carrying out the preferred process in which reactions I and II are carried out in separate reactors. In the drawings like numbers refer to like parts.

In the technical apparatus represented by FIG. 3, there were circulated per hour 65 liters of an aqueous solution containing 13.0 grams of CuCl$_2$.2H$_2$O/1 and 6.7 grams of FeCl$_3$.6H$_2$O/1 via oxidation reactor 140, let-down vessel 142, chlorination reactor 144, let-down vessel 146, and back to reactor 140.

There were metered-in per hour, via line 148, 0.8 kg of liquid hydrogen cyanide stabilized with 0.1 weight % H$_3$PO$_4$, and this solution chlorinated to cyanogen chloride in reactor 144 by the addition of 2.0 kg/h of chlorine via line 150

Through the cyanogen chloride formed, a pressure of about 3 bar was built-up in the reactor, confined by pressure check valve 152 under which the cyanogen chloride went into solution up to a 5 weight % solution. In exceeding the established pressure, the cyanogen chloride-containing solution passed via line 154 to let-down container 146 where cyanogen chloride is set free to 1-2 weight %. The released solution goes via line 156 and pump 158 into the oxidation reactor 140 while there is metered-in, via line 160, 0.8 kg/h of hydrogen cyanide.

There were introduced, via line 162, 2.22 kg/h of 50% aqueous hydrogen peroxide (10% excess) and therewith, the hydrochloric acid (1.08 kg HCl/h) formed in the chlorinator 144 also reacted with the hydrogen cyanide to form cyanogen chloride. Also, in reactor 140, there was built up a pressure of about 3 bar through the gases formed, which pressure as held constant by pressure check valve 164. The cyanogen chloride dissolved under pressure was freed of the catalyst solution, arriving in let-down vessel 142, via line 168, by release of the relief valve 166, and was combined in line 170, together with the cyanogen chloride leaving let-down vessel 146 via line 172 and led to a drier (not shown) for trimerization to cyanuric chloride.

The solution released in let-down vessel 142 arrived via line 174 in washer 176 where the off-gases originating from the strippers 178 and 180 were washed free of hydrogen cyanide. The wash solution goes via line 182 and pump 184 into the chlorination reaction 144.

From the let-down vessel 146, the acidic catalyst solution went, via line 186 and valve 188, into the stripper 178, and, from there, via line 190 and pump 192, to pressure washer 194 where the gas mixture (O$_2$, N$_2$, CO$_2$) leaving via valve 164, was washed free of cyanogen chloride. The wash solution passed via line 196 and pump 198 to reactor 140. Gases leaving the top of reactor 140 passed, via line 200, to pressure washer 194.

The waste water removed, having a hydrochloric acid content of 0.3 to 0.4 weight at let-down vessel 142, was drawn-off, via line 202 and valve 204, stripped in stripper 180, and freed of Cu++ and Fe+++ via line 206 and valve 208 or valve 210.

Since, besides the copper and iron ions, phosphoric acid also should be separated-off with the help of the cation exchanger 212 (or 214), and the phosphoric adheres to the material in the ion exchanger, this phosphoric acid as first washed ot with 0.5 weight % aqueous sodium hydroxide before the copper and iron ions were eluted and returned to the cycle via line 220 and pump 222.

The waste water was then led through line 216 (or 218) to the sewer. Catalyst solution is initially introduced via line 220 and 224.

The process can comprise, consist essentially of, or consist of the steps set forth.

What is claimed is:

1. In a process for the production of cyanogen chloride or cyanogen bromide by reaction of (1) hydrogen cyanide with (2) hydrogen chloride or hydrogen bromide, and (3) hydrogen peroxide, in aqueous medium, in the presence of cupric ions and ferric ions as catalysts, the improvement comprising carrying out the reaction at a pressure of 1.5 to 16 bar and recovering the cyanogen chloride or cyanogen bromide free from oxygen and nitrogen.

2. A process according to claim 1 for the production of cyanogen chloride by reaction of hydrogen chloride with hydrogen peroxide in aqueous medium.

3. A process according to claim 2 wherein there is employed (a) at least 0.005 mole of cupric ion per liter of solution; and (b) at least 0.005 mole of ferric ion per liter of solution.

4. A process according to claim 3 wherein there is employed (a) 0.005 to 0.5 mole of cupric ion per liter of solution; and (b) 0.005 to 0.5 mole of ferric ion per liter of solution.

5. A process according to claim 4 wherein there is employed 0.077 mole of cupric ion and 0.0125 to 0.025 mole of ferric ion per liter of solution.

6. A process according to claim 2 wherein the pressure is 2 to 4 bar.

7. A process according to claim 6 wherein the pH is 0.25 to 0.35.

8. A process according to claim 2 wherein the pH is 0.1 to 0.5.

9. A process according to claim 8 wherein the reaction is carried out at 40° to 60° C.

10. A process according to claim 2 wherein the reaction is carried out at 40° to 60° C.

11. A process according to claim 2 carried out in a continuous manner and comprising removing the cupric and ferric ions from the water brought in with the reactants and formed in the reaction by passing the aqueous medium through a cation exchanger.

12. A process according to claim 11 wherein the cation exchanger is a macroporous styrene resin having weak, acid cation-exchange-active groups attached thereto.

13. A process according to claim 11 wherein the hydrogen cyanide is stabilized with phosphoric acid and the exhausted cation exchanger is treated with an alkaline-acting material to remove the phosphoric acid and then is treated with mineral acid to remove the copper and iron bound to the exchanger.

14. A process according to claim 2 comprising recirculating the reaction solution, releasing the pressure on the reaction solution to reduce the solubility of the dissolved cyanogen chloride and enable the cyanogen chloride to be separated from the aqueous reaction solution, stripping a portion of the thus-pressure-released reaction solution solution to remove cyanogen chloride therefrom, and sending said stripper portion to a pressure washer, maintaining the pressure in the pressure washer by the oxygen, nitrogen, carbon dioxide and cyanogen chloride-containing gases formed in the reaction, and employing a portion of the pressure-released reaction solution for washing the cyanogen chloride gas volatilized during the stripping to remove hydrogen cyanide therefrom.

15. The process of claim 14 wherein the at least a portion of the hydrogen chlorine is formed in the circulating catalyst-containing solution by reacting chlorine and hydrogen cyanide in said catalyst solution.

16. The process of claim 2 wherein the reaction solution is recirculated and at least a portion of the hydrogen chloride is formed in the circulating catalyst-containing solution by reacting chlorine and hydrogen cyanide in said catalyst solution.

17. The process of claim 16 wherein the hydrogen chloride is formed at atmospheric pressure.

18. The process of claim 16 wherein the hydrogen chloride is formed at a pressure of 1.5 to 16 bar.

19. The process of claim 17 wherein both (a) the reaction of the hydrogen cyanide, hydrogen chloride, and the hydrogen peroxide; and (b) the reaction of chlorine and hydrogen cyanide are both carried out at 2 to 4 bar.

20. The process of claim 16 wherein the cupric and ferric ions are removed from the water brought in with the reactants and the water formed in the reaction by passing the aqueous medium through a cation exchanger.

21. The process of claim 20 wherein the cation exchanger is a macroporous styrene resin having weak, acid cation-exchange-active groups attached thereto.

22. The process of claim 21 wherein the hydrogen cyanide is stabilized with phosphoric acid and the exhausted cation exchanger is treated with an alkaline-acting material to remove the phosphoric acid and then is treated with mineral acid to remove the copper and iron bound to the exchange resin.

23. The process of claim 16 wherein the concentration of the hydrochloric acid is 0.5 to 36%.

24. A process according to claim 2 carried out in a continuous manner and comprising removing the cupric and ferric ions from the water brought in with the reactants and formed in the reaction by precipitation with alkaline or alkaline earth hydroxides.

25. A process according to claim 24 carried out in a continuous manner and comprising removing the cupric and ferric ions from the water brought in with the reactants and formed in the reaction by precipitation at a pH-value from 10 – 11 and at a temperature of about 100° C.

* * * * *